(12) United States Patent
Schick et al.

(10) Patent No.: US 9,180,538 B2
(45) Date of Patent: Nov. 10, 2015

(54) BRAZING PROCESS, BRAZE ASSEMBLY, AND BRAZED ARTICLE

(75) Inventors: David Edward Schick, Greenville, SC (US); Dean William Morrison, Greenville, SC (US); Srikanth Chandrudu Kottilingam, Simpsonville, SC (US); Yan Cui, Greenville, SC (US); Brian Lee Tollison, Greenville, SC (US); Dechao Lin, Greenville, SC (US)

(73) Assignee: General Electric Company, Schenectady, NY (US)

( * ) Notice: Subject to any disclaimer, the term of this patent is extended or adjusted under 35 U.S.C. 154(b) by 749 days.

(21) Appl. No.: 13/273,301

(22) Filed: Oct. 14, 2011

(65) Prior Publication Data

US 2013/0095342 A1    Apr. 18, 2013

(51) Int. Cl.
| | |
|---|---|
| B23K 35/00 | (2006.01) |
| B23K 35/02 | (2006.01) |
| B23K 1/008 | (2006.01) |
| B23K 1/19 | (2006.01) |
| B23K 3/06 | (2006.01) |

(52) U.S. Cl.
CPC . *B23K 1/008* (2013.01); *B23K 1/19* (2013.01); *B23K 3/0623* (2013.01); *B23K 2203/00* (2013.01); *Y10T 428/12389* (2015.01)

(58) Field of Classification Search
CPC .... B23K 1/0008; B23K 1/0018; B23K 1/008; B23K 2201/12; B23K 35/0244; B23K 1/001; B23K 1/19; B23K 1/20; B23K 2201/001; B23K 3/087
USPC ......................................... 228/56.3
See application file for complete search history.

(56) References Cited

U.S. PATENT DOCUMENTS

| | | | |
|---|---|---|---|
| 3,390,986 A | | 7/1968 | Stenerson |
| 3,716,347 A | | 2/1973 | Bergstrom et al. |
| 5,791,551 A | * | 8/1998 | Parks et al. .................... 228/184 |
| 6,112,971 A | * | 9/2000 | Castaldo et al. ............. 228/126 |
| 6,119,927 A | * | 9/2000 | Ramos et al. ................. 228/254 |
| 6,843,823 B2 | | 1/2005 | Kovacich |
| 7,279,229 B2 | | 10/2007 | Budinger et al. |
| 7,651,023 B2 | | 1/2010 | Huang et al. |
| 7,789,288 B1 | | 9/2010 | Johnson et al. |
| 2010/0059573 A1 | * | 3/2010 | Kottilingam et al. ......... 228/164 |

* cited by examiner

*Primary Examiner* — Erin Saad
(74) *Attorney, Agent, or Firm* — McNees, Wallace & Nucick, LLC

(57) ABSTRACT

A brazing process, a braze assembly, and a brazed article are disclosed. The brazing process includes applying a braze material to an article within a vacuum chamber while the vacuum chamber is substantially evacuated. The braze assembly is capable of applying a braze material to an article within a vacuum chamber while the vacuum chamber is substantially evacuated. The brazed article is devoid of re-formed oxides.

15 Claims, 2 Drawing Sheets

BRAZING PROCESS, BRAZE ASSEMBLY, AND BRAZED ARTICLE

FIELD OF THE INVENTION

The present invention is directed to processes, materials, and products relating to metal and metallic components. More specifically, the present invention is directed to brazing processes, brazing assemblies, and brazed products.

BACKGROUND OF THE INVENTION

Known brazing processes include a vacuum cleaning cycle in a vacuum chamber to remove surface oxides from a base material of an article. The cleaning cycle enables wetting of a surface of the base material that is to be brazed. Once cleaned, the article is removed from the vacuum chamber and a braze paste, pre-sintered preform, or other similar braze material is applied to the surface. The article is then placed back into the vacuum chamber.

These brazing processes suffer from several drawbacks. For example, once the article is removed from the vacuum chamber, oxides form or reform. These processes have long been unable to completely prevent oxides from forming or reforming. Such forming and reforming of oxides is especially prevalent in complex shapes, cavities, fissures, or other regions that are difficult to reach or view. In addition, such processes involve multiple cycles to complete a brazing process, thereby extending the overall duration of the brazing process.

Alternatively, multiple vacuum chambers are used. Multiple cycles, extended durations for brazing processes, and multiple chambers can result in undesirably high operational and/or capital costs.

Known processes attempt to reduce oxide formation and reformation. For example, mechanical cleaning, such as with carbide burr, can remove some oxides, especially surface oxides. However, mechanical cleaning is unable to remove all oxides, such as oxides that are not on the surface, can be inconsistent, and can form dust. Ultrasonic cleaning can remove dirt and grease. However, ultrasonic cleaning does not remove all surface oxides. Nickel plating can be used to improve wetting on material that quickly form or reform oxides, but adds substantial costs and cannot be applied in all circumstances.

A brazing process, a braze assembly, and a brazed article not suffering from one or more of the above drawbacks would be desirable in the art.

BRIEF DESCRIPTION OF THE INVENTION

In an exemplary embodiment, a brazing process includes applying a braze material to an article within a vacuum chamber while the vacuum chamber is substantially evacuated.

In another exemplary embodiment, a braze assembly is capable of applying a braze material to an article within a vacuum chamber while the vacuum chamber is substantially evacuated.

In another exemplary embodiment, a brazed article includes a treatment region selected from the group consisting of a joint, a fissure, a crack, and uneven abutment. The treatment region of the brazed article is substantially devoid of re-formed oxides.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is an exemplary brazing process, braze assembly, and brazed article that do not suffer from one or more of the above drawbacks. Embodiments of the present disclosure permit re-formed oxides to be reduced or completely eliminated from brazed articles, permit use of materials previously believed to be undesirable for brazing due to their propensity for forming oxides, permit increased use of brazing in conjunction with complex shapes, cavities, fissures, or other regions that are difficult to reach or view, permit separate cleaning cycles to be eliminated, permit reduction of costs, increased production rates, briefer braze cycle durations, and combinations thereof. As used herein the term, "re-formed oxides" refers to oxides that are traditionally formed by exposure to atmospheric conditions and/or are removed by the disclosed process temperatures and/or pressures.

Figure 1:
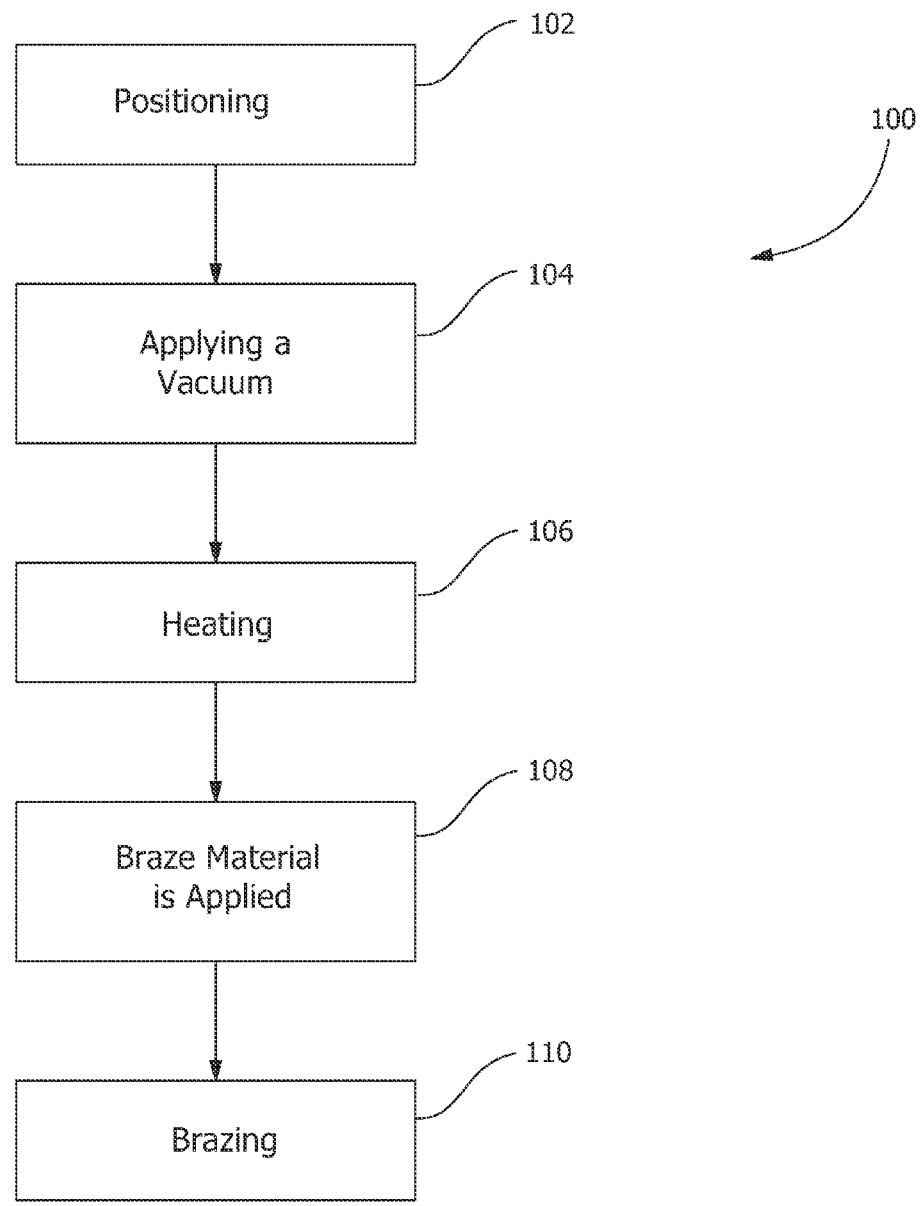
FIG. 1 is a flow diagram of an exemplary brazing process according to the disclosure.

FIG. 1 shows a brazing process 100 according to the disclosure. The brazing process 100 includes positioning (step 102). The positioning (step 102) includes adjusting and orienting an object to be brazed, such as an article 200 (see FIG. 2), into a predetermined position, such as in a vacuum chamber 202 (see FIG. 2). The predetermined positioning is in any suitable orientation. In one embodiment, the article 200 is positioned such that a braze assembly 204 (see FIG. 2) and/or a braze material 206 (see FIG. 2) are above or partially above the article 200, for example, in a direction opposite that of gravity. The article 200 is any suitable component. In one embodiment, the article 200 is a component of a turbine, such as a hot gas path turbine component selected from the group consisting of a blade, a dovetail of a blade, a shroud, a nozzle, a bucket, or any combination thereof. For example, in one embodiment, a hole from the casting process of a bucket is plugged according to the process 100.

The brazing process 100 further includes applying a vacuum (step 104), for example, to the vacuum chamber 202. In one embodiment, the vacuum chamber 202 operates within a predetermined pressure range, for example, between about $10^{-1}$ torr and about $10^{-7}$ torr. The predetermined pressure range is below a pressure that reduces oxides in the article 200. For example, in one embodiment, the article 200 includes chromium oxide. In this embodiment, the article 200 is brazed at a pressure below about $10^{-1}$ torr. In one embodiment, the article 200 is a nickel-based alloy and is brazed at a pressure below about $10^{-4}$ torr. In another embodiment, a partial-pressure environment with argon, nitrogen, or hydrogen is used.

The brazing process 100 further includes heating (step 106), for example, by applying heat to the vacuum chamber 202, to the article 200, to the braze assembly 204, to the braze material 206, or to any suitable combination thereof at a predetermined vacuum pressure. The heating (step 106) cleans and removes oxides on any and/or all exposed surface (s) within the vacuum chamber 202. Upon reaching a braze application temperature, a braze material 206 is applied (step 108).

The braze material 206 is one or more suitable braze structures. In one embodiment, the braze material 206 is a pre-sintered preform (PSP), such as a PSP braze ball, a PSP chiclet, a PSP foil, or other suitable PSP structure. In one embodiment, the braze material 206 is layered with different materials within each layer, for example, as described in FIG. 4 below.

The braze material application temperature is any suitable temperature and corresponds to the braze material 206. In one embodiment, the braze application temperature is between about 0° F. and about 200° F. below the braze temperature of the braze material 206, between about 50° F. and about 100° F. below the braze temperature of the braze material 206, between about 100° F. and about 200° F. below the braze temperature of the braze material 206, between about 100° F. and about 150° F. below the braze temperature of the braze material 206, between about 150° F. and about 200° F. below the braze temperature of the braze material 206, at about 0° F. below the braze temperature of the braze material 206, at about 50° F. below the braze temperature of the braze material 206, at about 100° F. below the braze temperature of the braze material 206, at about 150° F. below the braze temperature of the braze material 206, at about 200° F. below the braze temperature of the braze material 206, at a temperature above and pressure below that which destroys all oxidized portions, at a temperature above and pressure below that vaporizes all contaminants, or any suitable combination or sub-combination thereof.

Figure 2:
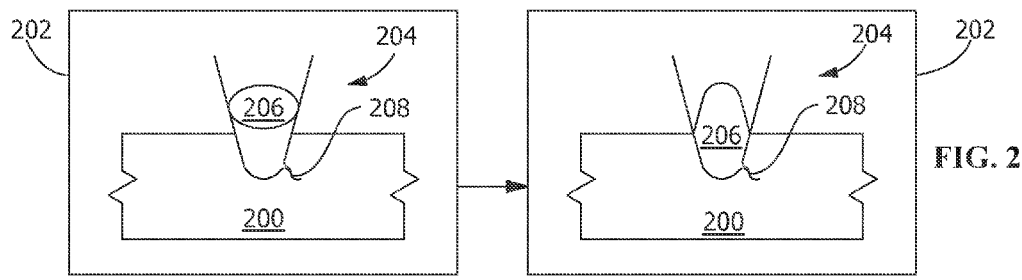
FIG. 2 is a schematic view of an exemplary braze assembly and a deforming braze material forming an exemplary brazed article according to the disclosure.

During the braze material application (step 108), the braze material 206 is repositioned, for example, by gravity, from within the braze assembly 204 to the article 200 (see FIG. 2). In one embodiment, the article 200 includes a treatment region 208, such as one or more recesses, one or more fissures, one or more cracks, one or more joints, one or more uneven abutments, other suitable feature, or combinations thereof. The braze material 206 contacts and/or fills all or a portion of the treatment region 208. In one embodiment, the treatment region 208 is treated with little or no oxides reforming, in comparison to previous techniques that were unable to treat similar regions without formation of oxides.

As is further described below, the braze material application (step 108) includes one or more of deformation of the braze material 206 (see FIG. 2), releasing of the braze material 206 by a braze material securing device 302 (see FIG. 3), releasing of the braze material 206 by a braze material securing layer 402 (see FIG. 4), and releasing of the braze material 206 by adjustment of the braze assembly 204 (see FIG. 5).

FIG. 2 shows the braze assembly 204 and the braze material 206, with the braze material 206 being deformable, according to an embodiment. In this embodiment, the braze material 206 is repositioned from the braze assembly 204, and thus applied to the article 200, while in the vacuum chamber 202, through the braze material 206 deforming, such as, by softening, melting, vaporizing/subliming, contracting, or combinations thereof. In one embodiment, the braze material 206 includes dimensions such that the deformation of the braze material 206 facilitates the repositioning from the braze assembly 204. In one embodiment, the deformation occurs at the braze application temperature.

Figure 3:
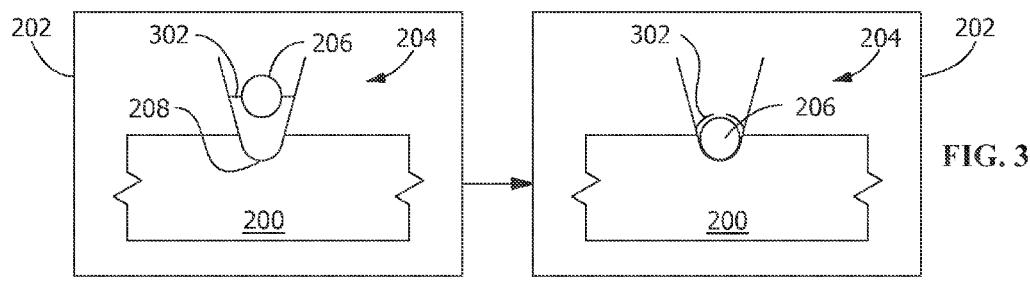
FIG. 3 is a schematic view of an exemplary braze assembly with a braze material securing device releasing a braze material to form an exemplary brazed article according to the disclosure.

FIG. 3 shows the braze assembly 204 and the braze material 206, with the braze material 206 being releasably secured by the securing device 302, according to an embodiment. In this embodiment, the braze material 206 is repositioned from the braze assembly 204, and thus applied to the article 200, while in the vacuum chamber 202, through adjustment of the securing device 302. In one embodiment, adjustment of the securing device 302 occurs at the braze application temperature. The securing device 302 then falls toward article 200 and/or vaporizes. In one embodiment, the securing device 302 is reusable in subsequent processes after the process 100. In another embodiment, the securing device 302 is destroyed or vaporized during the process 100. In one embodiment, the securing device 302 includes material selected from the group consisting of wires, mesh, polymers, mechanical devices, frames, or combinations thereof.

Figure 4:
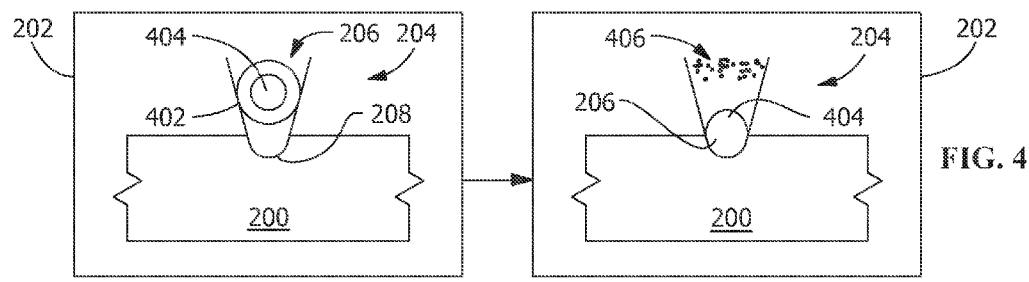
FIG. 4 is a schematic view of an exemplary braze assembly with a braze material securing layer releasing a braze material to form an exemplary brazed article according to the disclosure.

FIG. 4 shows the braze assembly 204 and the braze material 206, with the braze material 206 in a braze material layer 404 being releasably secured by the braze material securing layer 402, according to an embodiment. In one embodiment, braze material securing layer 406 releases all or a portion of the braze material 206 in the braze material layer 404 at the braze application temperature. The braze material 206 from the braze material layer 404 then falls toward article 200 and is applied. In one embodiment, additional layers (not shown) are within the braze material layer 404. The layers deform, such as, by softening, melting, vaporizing/subliming, contracting, or combinations thereof, thereby permitting additional control of the process 100.

Figure 5:
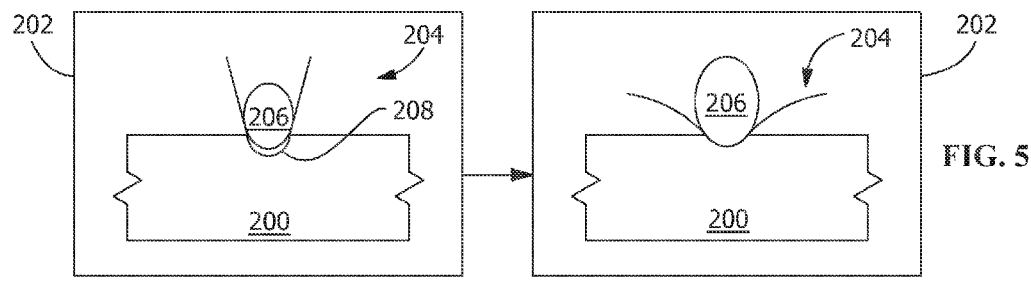
FIG. 5 is a schematic view of an exemplary braze assembly releasing a braze material to form an exemplary brazed article according to the disclosure.

FIG. 5 shows the braze assembly 204 and the braze material 206, with the braze material 206 being releasably secured by the braze assembly 204, according to an embodiment. In this embodiment, the braze material 206 is repositioned from the braze assembly 204, and thus applied to the article 200, while in the vacuum chamber 202, through adjustment of the braze assembly 204. In one embodiment, adjustment of the braze assembly 204 occurs at the braze application temperature. In one embodiment, the braze assembly 204 is capable of being used in subsequent processes after the process 100. For example, in one embodiment, the braze assembly 204 adjusts the position and/or orientation of one or more braze assembly features 502. In one embodiment, such adjustments occur based upon the braze assembly features 502 having a bimetallic composition, thus, permitting them to deform in a predetermined direction (such as, bending away) from the treatment region 208 at the braze application temperature.

Upon the braze material application (step 108) occurring, brazing (step 110) of the article 200 then occurs. The brazing (step 110) occurs at the braze temperature, which is based upon the braze material 206 or materials used by melting and/or fusing the braze material 206 to a portion or all of the treatment region 208, and is above the braze application temperature. In one embodiment, with the braze material 206 being a nickel-based braze alloy, the brazing application temperature is between about 1600° F. and 2300° F.

The braze material 206 is any suitable material or materials. The braze material 206 or layers forming the braze material 206 are any combination selected from the group of following compositions. Likewise, the article 200 includes any suitable material having a composition selected from the following compositions.

In one embodiment, the braze material 206 has a composition, by weight, of about 12% to about 20% Pd, about 0.1% to about 5% B/Si, about 2% to about 16% Al, about 7% to about 15% Cr, a balance of Ni, and incidental impurities.

In one embodiment, the braze material 206 has a composition, by weight, of about 12% to about 20% Pd, about 0.1% to about 5% B/Si, about 2% to about 16% Al, about 7% to about 15% Cr, about 3% to about 10% Ti, a balance of Ni, and incidental impurities.

In one embodiment, the braze material 206 has a composition, by weight, of about 12% to about 20% Pd, about 0.1% to about 5% B/Si, about 2% to about 16% Al, about 7% to about 15% Cr, about 3% to about 10% Ti, about 1% to about 3% Ta, about 0.5% to about 3% Zr, a balance of Ni, and incidental impurities.

In one embodiment, the braze material 206 has a composition, by weight, of about 12% to about 20% Pd, about 0.1% to about 5% B/Si, about 2% to about 16% Al, about 7% to about 15% Cr, about 3% to about 10% Ti, about 1% to about 15% Co, balance of Ni.

In one embodiment, the braze material 206 has a composition, by weight, of about 12% to about 20% Pd, about 0.1% to about 2% B, about 2% to about 16% Al, about 7% to about 15% Cr, about 3% to about 10% Ti, about 1% to about 3% Ta, about 0.5% to about 3% Zr, a balance of Ni, and incidental impurities.

In one embodiment, the braze material 206 has a composition, by weight, of about 12% to about 20% Pd, about 2% to about 5% Si, about 2% to about 16% Al, about 7% to about 15% Cr, about 3% to about 10% Ti, about 1% to about 3% Ta, about 0.5% to about 3% Zr, a balance of Ni, and incidental impurities.

In one embodiment, the braze material 206 has a composition, by weight, of about 10% to about 15% Pd, about 3% to about 5% Si, about 15% to about 28% Ti, about 10% to about 18% Zr, a balance of Ni, and incidental impurities.

In one embodiment, the braze material 206 has a composition, by weight, of about 12% to about 20% Pd, about 0.1% to about 5% B/Si, about 2% to about 16% Al, about 7% to about 15% Cr, about 0.5% to about 2.5% Ta, a balance of Ni, and incidental impurities.

In one embodiment, the braze material 206 has a composition, by weight, of about 6.4% Al, about 9.3% Co, about 15.6% Cr, about 0.9% Mo, about 1.0% Ta, about 6% Ti, about 1.3% W, about 0.5% C, a balance of Ni, and incidental impurities.

In one embodiment, the braze material 206 has a composition, by weight, of about 0.15% to about 0.19% C, about 13.7% to about 14.3% Cr, about 9.0% to about 10.0% Co, about 4.8% to about 5.2% Ti, about 2.8% to about 3.2% Al, about 3.7% to about 4.3% W, about 3.7% to about 4.3% Mo (with about 7.7% minimum W and Mo combined), a balance of Ni.

In one embodiment, the braze material 206 has a composition, by weight, of up to between about 0.02% to about 0.05% C (or more specifically 0% C), between about 8% and about 23% Cr (or more specifically between about 14.8% and about 15.8% Cr or at about 15.3% Cr), between about 4% and about 18% Co (or more specifically, between about 9.5% and about 11.0% Co or at about 10.25% Co), between about 1.5% and about 6.0% Ta (or more specifically, between about 3.0% and about 3.8% Ta or at about 3.4% Ta), between about 1.0% and about 6.0% Al (or more specifically between about 3.2% and about 3.7% Al or 3.45% Al), between about 0.3% and 1.5% B (or more specifically, between about 0.8 and about 1.2% B or 1.0% B), between about 2.0% and about 6.0% Si (or more specifically, between about 3.5% and about 4.1% Si or about 3.8% Si), a balance of Ni, and incidental impurities.

In one embodiment, the braze material 206 has a composition, by weight, of between about 11.45% and about 12.05% Co, between about 6.6% and about 7.0% Cr, between about 5.94% and about 6.3% Al, between about 1.3% and about 1.7% Mo, between about 4.7% and about 5.0% W, between about 6.2% and about 6.5% Ta, between about 2.6% and about 3.0% Re, between about 1.3% and about 1.7% Hf, between about 0.10% and about 0.14% C, up to about 0.02% Ti, a balance of Ni, and incidental impurities.

In one embodiment, the braze material 206 has a composition, by weight, of between about 0.13% and about 0.19% C, between about 13.7% and about 14.3% Cr, between about 9.0% and about 10.0% Co, between about 4.6% and about 5.2% Ti, between about 2.8% and about 3.2% Al, between about 0.5% and about 0.8% B, between about 4.2% and about 4.8% Si, a balance of Ni, and incidental impurities.

In one embodiment, the braze material 206 has a composition, by weight, of up to about 0.01% C, between about 18.5% and 19.5% Cr, up to about 0.03% B, between about 9.8% and about 10.3% Si, a balance of Ni, and incidental impurities.

In one embodiment, the braze material 206 has a composition, by weight, of between about 8% and about 23% Cr, between about 4% and about 18% Co, between about 1.5% and about 6.0% Ta, between about 1.0% and about 6.0% Al, between about 0.3% and about 1.5% B, between about 2.0% and about 6.0% Si, up to about 0.2% C, a balance of Ni, and incidental impurities.

In one embodiment, the braze material 206 has a composition, by weight, of between about 0.15% and about 0.19% C, between about 13.7% and about 14.3% Cr, between about 9.0% and 10.0% Co, between about 4.8% and 5.2% Ti, between about 2.8% and about 3.2% Al, between about 3.7% and about 4.3% W, between about 3.7% and about 4.3% Mo (or more specifically, more than about 7.7% W and Mo combined), a balance Ni, and incidental impurities.

In one embodiment, the braze material 206 has a composition, by weight, of between about 0.10% and about 0.14% C, between about 6.6% and about 7.0% Cr, about 11.45% Co, up to about 0.2% Ti, between about 6.2% and about 6.5% Ta, between about 5.94% and about 6.3% Al, between about 4.7% and about 5.0% W, between about 1.3% and about 1.7% Mo, between about 1.3% and about 1.7% Hf, between about 2.6% and about 3.0% Re, a balance of Ni, and incidental impurities.

In one embodiment, the braze material 206 has a composition, by weight, of between about 0.01 and about 0.03% C, between about 7.4% and about 7.8% Cr, between about 2.9% and about 3.3% Co, between about 5.3% and about 5.6% Ta, between about 7.6% and about 8.0% Al, between about 3.7% and about 4.0% W, between about 0.01% and about 0.02% B, between about 0.12% and about 0.18% Hf, between about 1.5% and about 1.8% Re, between about 0.5% and about 0.6% Si, a balance of Ni, and incidental impurities.

In one embodiment, the braze material 206 has a composition, by weight, of up to about 0.05% C, between about 14.8% and about 15.8% Cr, between about 9.5% and about 11.0% Co, between about 3.0 and about 3.8% Ta, between about 3.2% and about 3.7% Al, between about 2.1% and about 2.5% B, a balance of Ni, and incidental impurities.

In one embodiment, the braze material 206 has a composition, by weight, of up to about 0.01% C, between about 18.5% and about 19.5% Cr, up to about 0.03% B, between about 9.8% and about 10.3% Si, a balance of Ni, and incidental impurities.

In one embodiment, the braze material 206 has a composition, by weight, of about 50.25% Ni, about 42% Fe, about 4.5% Si, about 3.25% B, and incidental impurities.

In one embodiment, the braze material 206 has a composition, by weight, of between about 15.0% and about 17.0% Mo, between about 14.5% and about 16.5% Cr, between about 4.0% and about 7.0% Fe, between about 3.0% and about 4.5% W, up to about 2.5% Co, a balance Ni, and incidental impurities.

In one embodiment, the braze material 206 has a composition, by weight, of between about 9% and about 11% Co, between about 7% and about 9% Cr, between about 9 and about 11% W, between about 2.5% and about 3.5% Ta, between about 5% and about 6% Al, between about 0.5% and about 1.5% Ti, between about 0.6% and about 0.8% Mo, between about 1.3% and about 1.7% Hf, between about 0.03% and about 0.08% Zi, between about 0.01% and about 0.02% B, between about 0.13% and about 0.17% C, a balance Ni, and incidental impurities.

In one embodiment, the braze material 206 has a composition, by weight, of between about 19% and about 21% Cr, between about 2.5% and about 3.5% Ta, between about 2.5% and about 3.5% B, between about 0.003% and about 0.005% Y, a balance of Ni, and incidental impurities.

In one embodiment, the braze material 206 has a composition, by weight, of about 0.1% C, about 22% Cr, about 9% Mo, about 0.5% W, about 1% Co, about 19% Fe, a balance Ni, and incidental impurities.

In one embodiment, the braze material 206 has a composition, by weight, of about 0.1% C, about 22% Cr, about 2% Mo, about 14% W, about 0.3% Al, about 0.5% Mn, about 0.4% Si, about 0.02% La, a balance Ni, and incidental impurities.

In one embodiment, the braze material 206 has a composition, by weight, of about 10% W, about 10% Co, about 8% Cr, about 5% Al, about 3% Ta, about 1% Hf, about 1% Ti, about 0.7% Mo, about 0.2% C, a balance of Ni, and incidental impurities.

In one embodiment, the braze material 206 has a composition, by weight, of between about 15.0% and 17.0% Mo, between about 14.5% and 16.5% Cr, between about 4.0% and about 7.0% Fe, between about 3.0% and about 4.5% W, up to about 2.5% Co, a balance Ni, and incidental impurities.

In one embodiment, the braze material 206 has a composition, by weight, of about 16% Cr, about 16.5% Mo, about 4% W, about 5.5% Fe, about 1% Co, a balance Ni, and incidental impurities.

In one embodiment, the braze material 206 has a composition, by weight, of between about 19% and about 21% Cr, between about 2.5% and about 3.5% Ta, between about 2.5% and about 3.5% B, between about 0.003% and about 0.005% Y, a balance Ni, and incidental impurities.

In one embodiment, the braze material 206 has a composition, by weight, of about 19.7% Cr, about 3.1% Ta, about 3.1% B, about 0.001% Y, a balance Ni, and incidental impurities.

After the brazing (step 110), the article 200 is further positioned and/or treated in any suitable manner. For example, in further embodiments, the article 200 is finished, for example, by grinding, sanding, coating, otherwise treating, or combinations thereof. Additionally or alternatively, in one embodiment, the article 200 is positioned, for example, by replacing a similar article, by positioning within a system, such as a gas turbine, a wind turbine, a steam turbine, a combustion system, or other suitable system or combinations thereof. Additionally or alternatively, the article 200 is analytically tested, for example, by analytical techniques for identifying additional regions to be treated and/or for identifying whether the treatment region 208 is devoid or substantially devoid of undesirable features, such as fissures and/or re-formed oxides, or combinations thereof.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A brazing process, comprising:
   providing an article, and a braze assembly including a braze material, wherein the article is a turbine component selected from a group consisting of a blade, a dovetail of a blade, a shroud, a nozzle, a bucket, or combination thereof;
   positioning the braze assembly and the article, wherein the braze assembly includes a configuration which contacts the article above a treatment region and mechanically suspends the braze assembly;
   placing the article and the braze assembly within a vacuum chamber;
   substantially evacuating the vacuum chamber to a predetermined vacuum pressure;
   heating the article and the braze assembly to a braze application temperature, the braze application temperature being below a braze temperature of the braze material, wherein heating the article and the braze assembly at the predetermined vacuum pressure cleans the article and the braze assembly, removing oxides; and
   subsequently applying the braze material to the treatment region from the braze assembly at the braze application temperature while the vacuum chamber is substantially evacuated.

2. The process of claim 1, wherein the article is substantially devoid of re-formed oxides.

3. The process of claim 1, wherein the article is devoid of re-formed oxides.

4. The process of claim 1, wherein the braze material is layered.

5. The process of claim 1, wherein the braze material is applied by gravity.

6. The process of claim 1, wherein the braze material is applied by deformation of the braze material.

7. The process of claim 6, wherein the deformation occurs by one or more of softening, melting, vaporizing, subliming, and contracting.

8. The process of claim 1, wherein the braze material is applied by releasing of the braze material by a braze material securing device.

9. The process of claim 8, wherein the braze material securing device vaporizes.

10. The process of claim 8, wherein the braze material securing device is reusable.

11. The process of claim 8, wherein the braze material securing device includes one or more of wires, mesh, polymers, mechanical devices, and frames.

12. The process of claim 1, wherein the braze material is applied by releasing of the braze material by a braze material securing layer of the braze material.

13. The process of claim 12, wherein the braze material securing layer deforms to release the braze material.

14. The process of claim 1, wherein the braze material is applied by releasing of the braze material by adjustment of the braze assembly.

15. The process of claim 14, wherein the adjustment of the braze assembly includes braze assembly features of the braze assembly deforming.

* * * * *